(12) United States Patent
Webb

(10) Patent No.: US 8,374,466 B2
(45) Date of Patent: Feb. 12, 2013

(54) METHODS OF STORING IMAGE FILES

(75) Inventor: Steven L. Webb, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/243,526

(22) Filed: Sep. 23, 2011

(65) Prior Publication Data

US 2012/0063650 A1     Mar. 15, 2012

Related U.S. Application Data

(62) Division of application No. 10/192,922, filed on Jul. 10, 2002, now Pat. No. 8,064,650.

(51) Int. Cl.
     *G06K 9/54*          (2006.01)

(52) U.S. Cl. ........................................ 382/305; 707/829

(58) Field of Classification Search .................. 382/118, 382/305; 707/828–831, 915
See application file for complete search history.

(56) References Cited

U.S. PATENT DOCUMENTS

| | | | |
|---|---|---|---|
| 5,164,992 A | 11/1992 | Turk et al. | |
| 6,038,333 A | 3/2000 | Wang | |
| 6,141,048 A | 10/2000 | Meyers | |
| 6,149,441 A * | 11/2000 | Pellegrino et al. | ............ 434/350 |
| 6,184,926 B1 | 2/2001 | Khosravi et al. | |
| 6,408,301 B1 * | 6/2002 | Patton et al. | ................... 707/741 |
| 6,549,913 B1 * | 4/2003 | Murakawa | .................... 382/118 |
| 6,606,398 B2 * | 8/2003 | Cooper | ......................... 382/118 |
| 6,711,587 B1 | 3/2004 | Dufaux | |
| 6,721,001 B1 | 4/2004 | Berstis | |
| 7,843,495 B2 | 11/2010 | Aas et al. | |
| 2001/0040986 A1 | 11/2001 | Farringdon et al. | |
| 2002/0002586 A1 | 1/2002 | Rafal et al. | |
| 2002/0067856 A1 | 6/2002 | Fujii et al. | |
| 2002/0080230 A1 * | 6/2002 | Van De Sluis et al. | .... 348/14.01 |
| 2004/0008258 A1 | 1/2004 | Aas et al. | |
| 2004/0243671 A9 | 12/2004 | Needham et al. | |
| 2007/0271226 A1 * | 11/2007 | Zhang et al. | ...................... 707/3 |

OTHER PUBLICATIONS

Houghton, Named Faces: Putting Names to Face, IEEE Intelligent Systems and their Applications [on-line], Sep./Oct. 1999, vol. 14, Issue: 5, pp. 45-50. Retrieved from http://ieeexplore.ieee.org/xpls/abs_all.jsp?arnumber=796089.*

Satoh, et al., Name-It: Naming and Detecting Faces in News Videoa, Jan.-Mar. 1999, IEEE Multimedia, vol. 6, Issue: 1.pp. 22-35.

Bederson, PhotoMesa: A Zoomable Image Using Quantum Treemaps and Bubblemaps. 2001, ACM, pp. 71-80.

* cited by examiner

*Primary Examiner* — Matthew Bella
*Assistant Examiner* — Dennis Rosario

(57) ABSTRACT

A method and apparatus for organizing digital images that contain a persons face is disclosed. A database of known faces allows the faces in the images to be identified. The names of the people identified in the image are used in naming the image files and in naming the path to the image files.

12 Claims, 4 Drawing Sheets

METHODS OF STORING IMAGE FILES

PRIORITY CLAIM

This divisional application claims priority to co-owned, U.S. patent application Ser. No. 10/192,922 filed on. Jul. 10, 2002 now U.S. Pat. No. 8,064,650 and titled "File management of digital images using the names of people identified in the images" of Steven L. Webb, hereby incorporated by reference as though fully set forth herein.

RELATED APPLICATIONS

This application is related to the application "Face recognition in a digital imaging system accessing a database of people" that has the application Ser. No. 10/193,030 and was filed on the same day as this application.

FIELD OF THE INVENTION

The field of this invention relates to digital imaging and more specifically to using the names of the people identified in the digital images to store and organize the images.

BACKGROUND OF THE INVENTION

Digital cameras create a large number of files. These files can be audio files, thumbnails or full digital images. Currently these files are named based on a default name given by the camera manufacture, for example DSC00001.jpg. Most digital cameras today can store a large number of these images. After taking pictures the user is presented with a list of these files with names that have no meaning to the user, for example DSC00001.jpg, DSC00002.jpg, DSC00003.jpg, DSC00004.jpg etc. When the user wants to share, print, or display a particular image, the user has to open and look at each file until the desired image is located.

Some cameras allow the user to rename the file but with the limited user interface available on most digital cameras, renaming the file is difficult and time consuming.

There is a need for a digital imaging system that can name the image files with a name or path that can help the user locate and organize the images that have been captured.

SUMMARY OF THE INVENTION

A digital imaging system that can create and maintain a database of people contained in images captured by the digital imaging system can simplify the identification of people in images. The digital imaging system uses the names of the people identified in the captured images to name the captured image file or to name the path to the captured image file.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
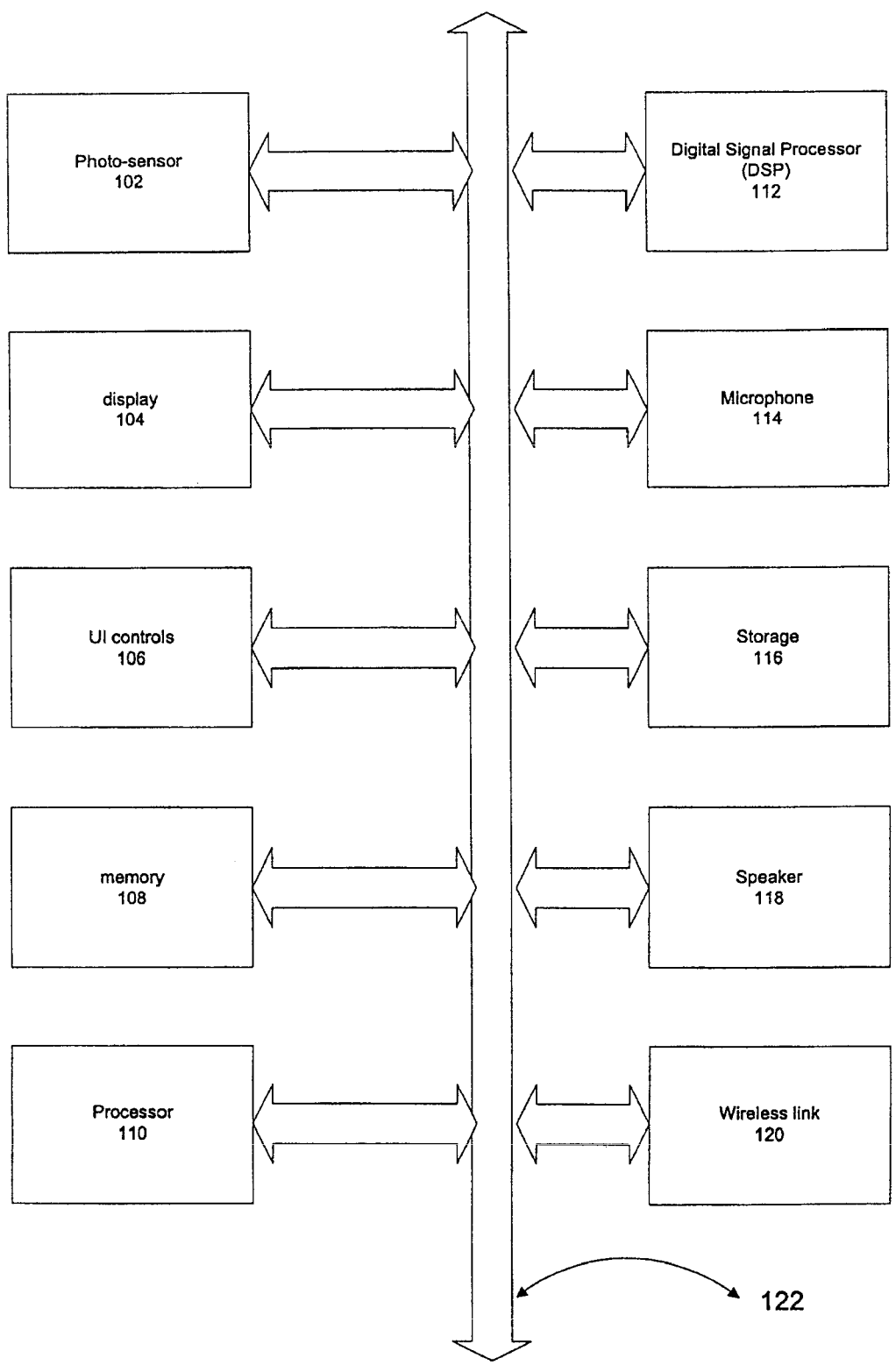
FIG. 1 is a block diagram of a digital imaging system in accordance with an example embodiment of the present invention.
Figure 2:
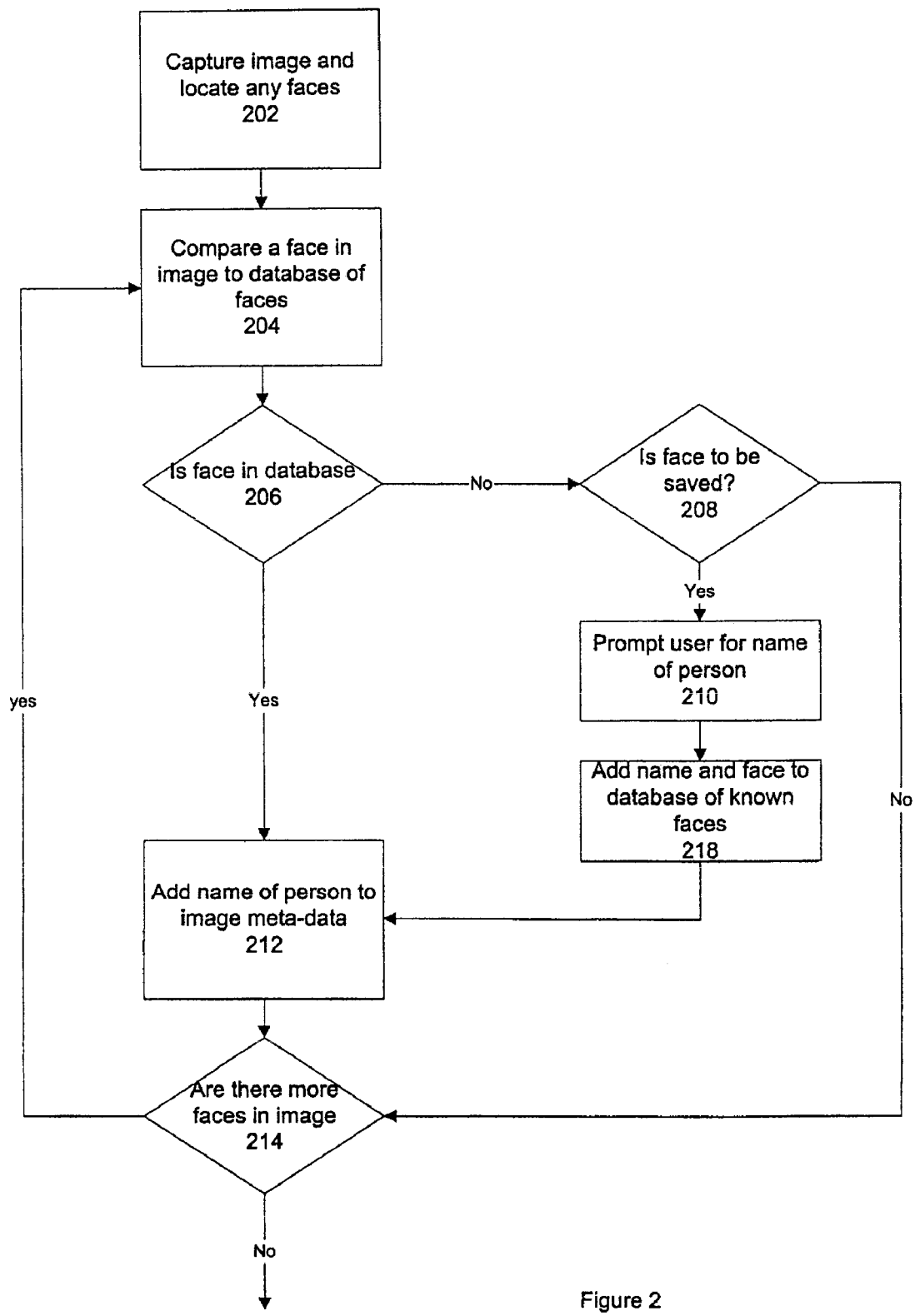
FIG. 2 is a flow chart for creating a database of faces contained in images in accordance with an example embodiment of the present invention.
Figure 3:
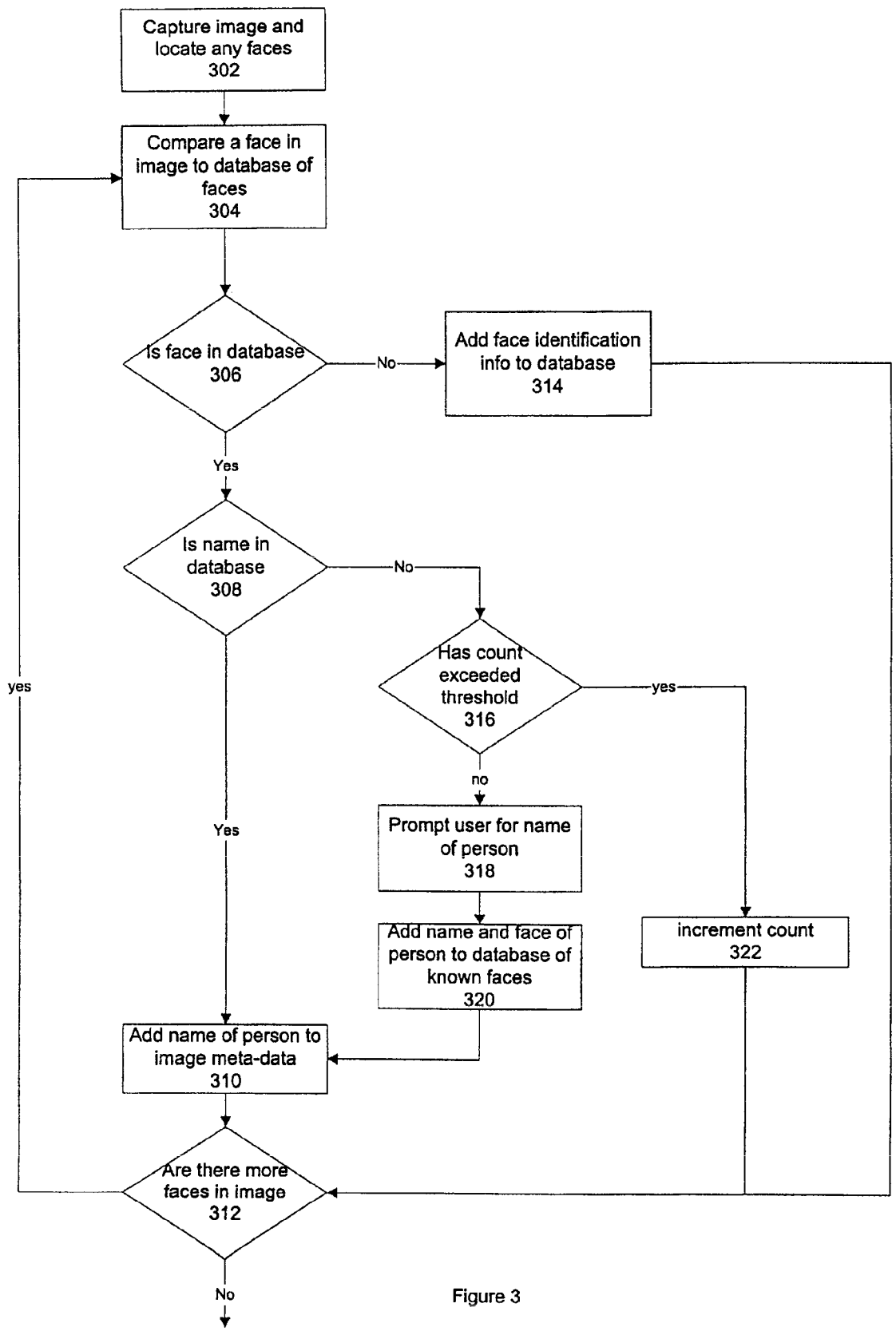
FIG. 3 is a flow chart for creating a database of faces contained in images in another example embodiment of the present invention.
Figure 4:
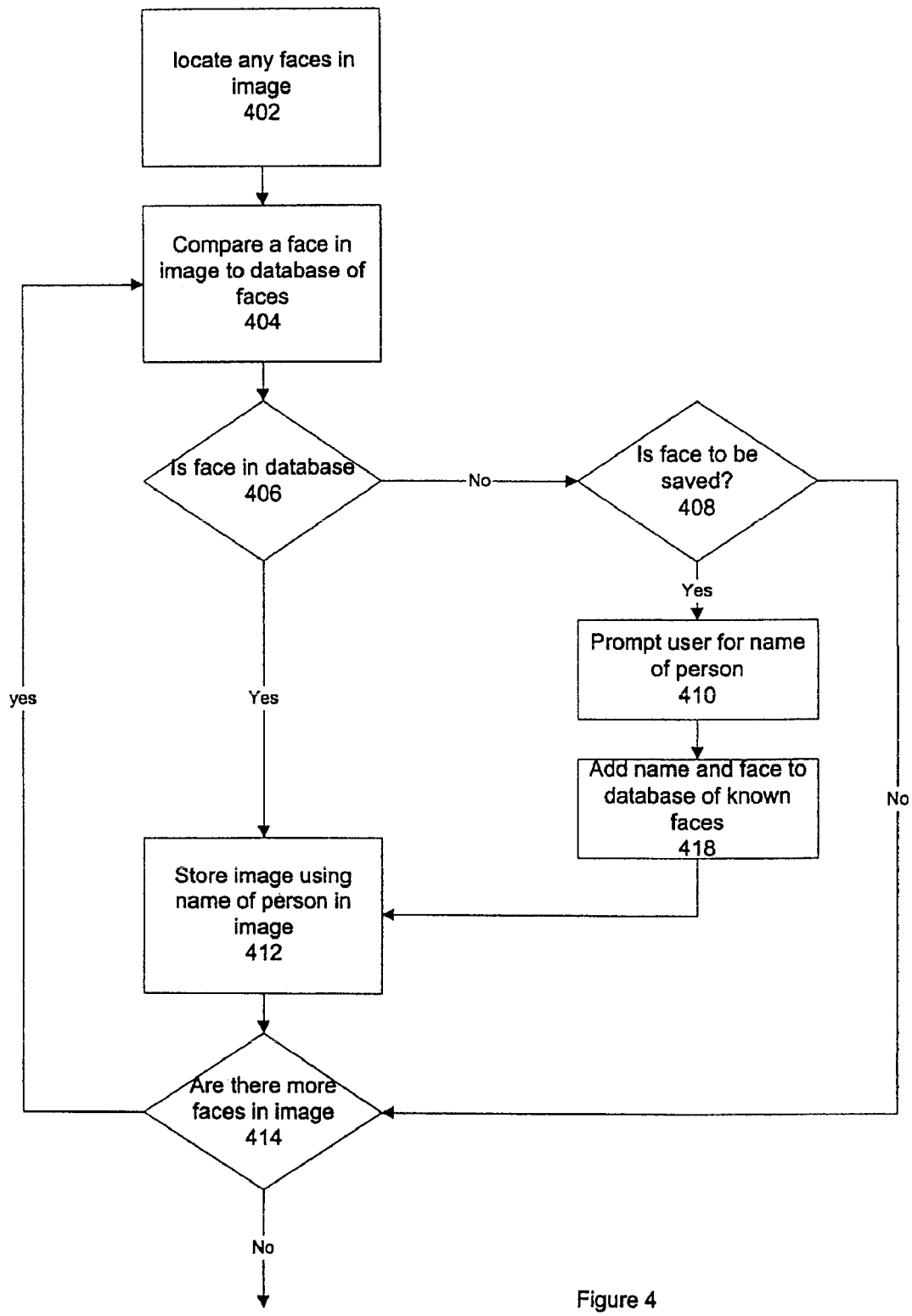
FIG. 4 is a flow chart for storing images using the names of people contained in images in an example embodiment of the present invention.

A system that can build a database of people captured in images taken by a digital device can facilitate the organization and management of those images.

Today there are a number of methods that can be used to detect a human face inside a digital image. U.S. Pat. No. 6,184,926 B1 "System and method for detecting a human face in uncontrolled environments" is one example and is hereby included by reference for all that it teaches. Once a human face has been identified inside a digital image, information about that face can be extracted such that the face can be identified in other images. For example U.S. Pat. No. 5,164,992 "Face recognition system", hereby included by reference, can compare faces in digital images to a set of reference faces to determine if any of the reference faces are present in the digital image.

Digital cameras today typically contain a photo-sensor (102) for capturing images; a display area (104) for displaying the captured images and controlling the digital camera; a storage area (116) for storing the captured images; memory (108), for temporary manipulation of the captured images and for running the firmware of the camera; a processor (110) for running the camera and some type of user interface (UI) controls (106). Some digital cameras also include a microphone (114) for capturing audio clips along with the digital images. Some digital cameras include a speaker (118) and a digital signal processor (DSP 112). The UI controls (106) on digital cameras may include physical controls like buttons, rocker switches, and a keyboard, and virtual controls shown in the display area. The digital images, video clips and audio clips captured by the digital camera may be stored in memory (108) or may be moved to the storage area (116). Today the memory and the storage area are typically different types of devices. The memory is typically fast volatile memory and the storage area is typically slower non-volatile memory. In the future, as the speed of non-volatile memory increases, all the memory may be of the non-volatile type. Digital cameras may also contain a wireless link (120) to the Internet, for example a cell phone.

An image file typically contains more information than just the raw image data. This additional data is typically called meta-data. Most image files also contain the time and date the file was created. Many image files also contain information about the image, for example the resolution of the image, the exposure settings used to capture the image, whether the image has been compressed, and if so how much compression was used. Some cameras contain global positioning systems (GPS, not shown) and include, in the image file, the location the file was created. There are many other types of information that can be included in an image file, for example the names of the people captured in the image may be stored as meta-data.

In one embodiment of the current invention, a digital camera would have access to a database of known faces. The face database may be contained in the memory (108) or storage area (116) of the camera and accessed using the internal bus (122) or the face database may be accessed remotely through a wireless link (for example a cell phone or a radio link). The remote database could also be accessed using an IR link or a cable link (Not shown), for example USB or SCSI. The database of faces would comprise at least the face identification information for a person and the name of the person. The digital camera would first capture an image (202). The image could be a single exposure or it could be a single frame from a video clip. The digital camera would evaluate the image to determine if any human faces were contained in the captured image (202). If there were human faces detected in the image, the camera would extract the face identifying information from each human face. The camera would then compare the face identifying information with the database of known faces (204). If a face in the image is already in the face database, the name of the person recognized in the image would be added to the meta-data for that image (212). If a face in the image was not already in the database, the user may optionally be asked if the face is to be saved (208). If the face is not to be saved the next face in the image is compared to the database of known faces. If the face is to be saved, the user is prompted to input the person's name (210). The name of the person and the face identification information is added to the database of known faces (218) and the name of the person is added to the meta-data of the image (212).

In another embodiment of the current invention, the user is not prompted to name a person until the person's face has appeared in a preset number of captured images. When a face in an image is not in the database of known faces, the face identifying information is automatically added to the database (314). Each time the face identification information is detected in another image a count is incremented (322). When the count exceeds a predetermined number, the user is then prompted to name the person (318). Once a person in the database of known faces has been named, the name of the person is added to the meta-data of any images containing that person's face (310). The user may adjust the number of times a face needs to appear in an image before the user is prompted to name the person. The user may decide that the person should not be named, even when the face has appeared in the preset number of images.

The digital camera can prompt the user to name a person in a number of ways. The digital camera can display the captured image in the display area and indicate the person to be named. A cursor can be placed below or next to the person to be named to indicate which person in the images needs to be named. An outline can be drawn around the person to be named or a shape can be drawn around the person to be named, for example a box, circle, or oval can be used. The user may name the person using the UI controls or may name the person verbally by speaking the person's name.

In one embodiment of the current invention, the database of known faces is empty when the user buys the camera. The database is built up as the user captures images with people in them and names the people in the images. In another embodiment a new camera is updated with a database of known faces from an older cameras when the user purchases the new camera. In another embodiment of the current invention, the database of known faces is not stored in the camera and the link to the database is transferred from an old camera to the new camera when the user buys a new camera. When the database of known faces is not contained in the camera, multiple cameras may link to the same database, for example when two people in the same family have two cameras, both cameras may be linked to the same database of known faces.

Once the name of the person has been added to the meta-data of the image containing the person, that information can be used to help organize or sort the large number of images created. For example, a user could create a list of all the images that contain "Eric Aas" by sorting the images using the meta-data.

In another embodiment of the current invention, the image file captured is named using the name of the people contained in the image. For example, when "Steven Webb's" face is identified in an image, the image could be named Stevenwebb01.jpg. In another embodiment of the current invention, a folder or sub-directory would be created for people identified in the images and each image containing those people would be moved or stored in that sub-directory. For example, all the images containing the face of "Steven Webb" would be moved or stored in the directory named StevenWebb. When an image contains multiple people stored in the database of known faces, a copy of the image could be stored in a directory for each person. Or the image could be stored in only one of the directories with a link to the stored image stored in each of the other directories.

In this application the descriptions of the embodiments used a digital camera to capture the image. This invention is not limited to a digital camera. A scanner that creates digital images from hardcopy images can also use the current invention. In fact any device that creates or capture images in digital form can also use the current invention, for example a web cam.

The foregoing description of the present invention has been presented for purposes of illustration and description. It is not intended to be exhaustive or to limit the invention to the precise form disclosed, and other modifications and variations may be possible in light of the above teachings. For example, this invention is not limited to digital imaging devices, this invention can be used to help name a file created in any manner. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of storing image files, comprising:
capturing an image;
storing the image in a file as a digitized image file;
locating at least one face in the digitized image file;
comparing the at least one face in the digitized image file to a database of known faces;
requesting a name of at least one person in the digitized image file for the face when the face does not match, as determined by the comparing, any of the known faces in the database,
storing the face and the name in the database of known faces;
creating a sub-directory with a sub-directory name based on the requested name of at least one person in the digitized image file; and
storing the captured image in the sub-directory.

2. The method of claim 1, wherein the sub-directory name includes at least the name of the at least one person in the digitized image file.

3. The method of claim 1, wherein the sub-directory name is the name of the at least one person in the digitized image file.

4. The method of claim 1, wherein the sub-directory name is the name of at least one person in the digitized image file.

5. The method of claim 1, wherein when the digitized image file has multiple people, a copy of the digitized image file is stored in a sub-directories each named for the multiple people.

6. The method of claim 1, wherein when the digitized image file has multiple people, a copy of the digitized image file is stored in the sub-directory named for the at least one person in the digitized image file, and a link to the copy is stored in sub-directories named for all other of each of the multiple people.

7. A method of storing image files, comprising:
digitizing an image
storing the digitized image in a file as a digitized image file;
locating at least one face in the digitized image file;
comparing the at least one face in the digitized image file to a database of known faces;
requesting a name of at least one person in the digitized image file for the face when the face does not match, as determined by the comparing, any of the known faces in the database,
storing the face and the name in the database of known faces;
creating a sub-directory with a sub-directory name based on the requested name of at least one person in the digitized image file; and
storing the digitized image in the sub-directory.

8. The method of claim 7, wherein the sub-directory name includes at least the name of the at least one person in the digitized image file.

9. The method of claim 7, wherein the sub-directory name is the name of the at least one person in the digitized image file.

10. The method of claim 7, wherein the sub-directory name is the name of at least one person in the digitized image file.

11. The method of claim 7, wherein when the digitized image file has multiple people, a copy of the digitized image file is stored in sub-directories named for each of the multiple people.

12. The method of claim 7, wherein when the digitized image file has multiple people, a copy of the digitized image file is stored in the sub-directory named for the at least one person in the digitized image file, and a link to the copy is stored in sub-directories named for all other of each of the multiple people.

* * * * *

UNITED STATES PATENT AND TRADEMARK OFFICE
CERTIFICATE OF CORRECTION

PATENT NO.      : 8,374,466 B2  
APPLICATION NO. : 13/243526  
DATED           : February 12, 2013  
INVENTOR(S)     : Steven L. Webb Page 1 of 1

It is certified that error appears in the above-identified patent and that said Letters Patent is hereby corrected as shown below:

In the Claims:

In column 5, line 3, in Claim 5, after "in" delete "a".

In column 5, line 12, in Claim 7, delete "image" and insert -- image; --, therefor.

Signed and Sealed this
Fourteenth Day of May, 2013

Teresa Stanek Rea
*Acting Director of the United States Patent and Trademark Office*